United States Patent Office 3,676,177
Patented July 11, 1972

3,676,177
METHOD OF STABILIZING RARE EARTH OXIDE PHOSPHOR IN DICHROMATE SENSITIZED COATING SLURRY
Michael J. Hammond and James W. Haynes, Towanda, Pa., assignors to Sylvania Electric Products Inc.
No Drawing. Filed Apr. 24, 1970, Ser. No. 31,771
Int. Cl. H01j *31/00*
U.S. Cl. 117—33.5 CM          12 Claims

ABSTRACT OF THE DISCLOSURE

The hydrolysis of rare-earth oxide phosphors contained in a slurry of an organic binder sensitized with a dichromate ion can be prevented by treating the phosphor or the slurry with a water soluble $PO_4^{-3}$ containing compound prior to the application of the slurry to a substrate.

BACKGROUND OF THE INVENTION

This invention relates to luminescent materials. More particularly, this invention relates to rare-earth oxide phosphors and to a method of treating such phosphors.

The invention has particular application to luminescent materials comprised of a rare-earth oxide host and a rare-earth activator selected from the lanthanide series of elements. This group of materials, or phosphors, includes gadolinium oxide ($Gd_2O_3$:A), yttrium oxide ($Y_2O_3$:A), and mixtures of the two, together with an activator, designated generally in the formula as A. While not generally so considered, yttrium, for purposes of this disclosure, is to be considered one of the rare-earth elements. All of the above-named materials have strong emission in the red region of the spectrum combined with a brightness considerably in excess of currently employed phosphors used in, for example, color cathode-ray tubes. In spite of these obvious qualifications, there has been a lack of acceptance of these phosphors by tube manufacturers. The two major reasons for this lack of acceptance, both stem from the two currently employed methods of making color-tube screens. These methods are generally distinguished as a dry phosphor deposition method and a slurry application method. This invention has general utility with the slurry deposition method.

In the slurry method, the phosphor is mixed with an organic binder such, for example, as polyvinyl alcohol (PVA) to form a slurry; for example, as by ball milling, and then a sensitizing agent in the form a dichromate ion furnishing compound is added. After the formation of the slurry is complete, it is applied to the screen area. Subsequently, the phosphor-coated screen area is exposed through a negative to actinic radiation and then developed by steps well understood in the art. The process is repeated for each of the colors needed in the final tube.

In regard, however, to the slurry application, it has been found that the longer the phosphor is in the slurry, the more effect there seems to be upon the emission qualities of the phosphor. This effect from long slurry shelf-life is denoted by a change in body color of the phosphor from white to yellow and gradual poisoning or killing of the phosphor material. Thus, a rare-earth oxide host phosphor remaining too long in contact with the sensitized organic binder ceases to be a phosphor and becomes an inert material exhibiting no appreciable luminescent properties under cathode-ray excitation. Furthermore, it has been found that the adherence properties of the rare-earth oxide host phosphors are important. The adherence capabilities degenerate rapidly in direct proportion to the length of time the phosphor exists in the slurry. The shelf-life of the slurry is extremely short, for example, a slurry mix of a rare-earth oxide host phosphor is generally limited to a shelf-life of around twelve hours. After this time, it is virtually impossible to secure adherence of the phosphor particles to the screen.

The poor adherence qualities and the slow poisoning of the phosphor material are believed to occur because of a reaction between the rare-earth oxide host phosphor and the dichromate ion present in the slurry as a photo-sensitizing agent. If the phosphor is allowed sufficient time in the slurry and the reaction is allowed to go to completion, the end result is no longer a rare-earth oxide, but a rare-earth chromate or dichromate combination.

It is a distinct advantage to have an increased shelf-life so that losses do not result from small production delays that are sometimes encountered.

It has been attempted in the past to prevent the chromate reaction by applying to the material a particular coating such as, for example, a silica, alkoxy-germanium or pyrophosphate. However, such coatings depend upon uniformity of application for their success and add an additional processing step to the manufacture thereof.

It is believed, therefore, that a process which increases the shelf-life of the rare-earth oxide phosphor slurry, enhances the adherence properties of phosphors on a substrate, and prevents dichromate reaction without adding additional steps and expense is an advancement in the art.

SUMMARY OF THE INVENTION

In accordance with one aspect of this invention, there is provided an improvement in the process for applying a layer of a rare-earth oxide host phosphor to a substrate by photochemical means. The improvement comprises admixing a water-soluble orthophosphate source with a rare-earth oxide host phosphor wherein the water-soluble orthophosphate source is present in an amount of about 0.5% to about 10%, by weight, with respect to the weight of the phosphor, prior to adding the rare-earth oxide host phosphor to an appropriate slurry composition.

In accordance with another aspect of this invention, there is provided an improvement which comprises admixing a water-soluble orthophosphate source with a slurry comprising an organic binder and a dichromate ion-furnishing compound, wherein the water-soluble orthophosphate source is present in an amount of about 0.5% to about 10%, by weight, with respect to the weight of the phosphor, prior to adding a rare-earth oxide host phosphor.

DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

Referring now to the invention with greater particularity, the method for preventing the deleterious reaction of the phosphor with the dichromate ion, which is present in the slurry formation as the sensitizer, is to insulate the phosphor from hydrolysis. Surprisingly, it has been found that this can be accomplished by admixing a water-soluble orthophosphate source with the rare-earth oxide host phosphor, prior to adding the rare-earth oxide host phosphor to an appropriate slurry. An alternate method is to admix a water-soluble orthophosphate source with the slurry containing the dichromate ion, prior to adding the rare-earth oxide host phosphor.

Any water-soluble orthophosphate source can be used, such as sodium orthophosphates and potassium orthophosphates, but it is preferred to use orthophosphoric acid and monoammonium orthophosphate. Especially preferred is monoammonium orthophosphate present in from about 0.5% to about 10%, by weight, with respect to the weight of the phosphor.

Amounts of the orthophosphate source from 0.5% to about 10% by weight based on the weight of the phosphor can be used, however, since normally the lower amounts, that is, from about .5% to 1% by weight yield adequate protection, these amounts are preferred. Amounts below about 0.5% by weight do not afford sufficient protection. Amounts above about 10% afford no appreciable benefits and in some instances detract from the properties of the phosphor.

Yttrium, for purposes of this invention, is to be considered one of the rare-earth elements and included in the lanthanide series. The preferred rare-earth oxide host phosphors are selected from the group consisting of yttrium oxide, gadolinium oxide, lanthanum oxide and yttrium gadolinium oxide. Generally, the water-soluble orthophosphate source, such as monoammonium orthophosphate, is admixed with the host phosphor before the host phosphor is added to an appropriate slurry. An alternative procedure is to admix the water-soluble orthophosphate source, such as monoammonium orthophosphate, with the slurry composition before adding the host phosphor. Typically, the slurry composition consists of a binder such as polyvinyl alcohol and a dichromate ion-furnishing compound. The preferred binder is polyvinylalcohol, while a preferred source of a dichromate ion-furnishing compound is ammonium dichromate.

To more fully illustrate the present invention, the following detailed examples are presented. All parts, proportions, and percentages are by weight, unless otherwise given.

EXAMPLE 1

Yttrium oxide host phosphor and monoammonium orthophosphate are admixed in the weight ratio of 1000:5 respectively. The admixture is then added to an appropriate slurry containing a binder and dichromate photosensitizer. The monoammonium phosphate-yttrium oxide host phosphor-containing slurry is applied to a substrate, exposed, developed, and dried by methods known to those skilled in the art.

The rare-earth oxide host phosphor so treated exhibited essentially the same cathode-ray brightness as virgin phosphor, and essentially no hydrolytic reaction with the dichromate ion.

EXAMPLE 2

Sufficient monoammonium orthophosphate (MAP) is admixed with a slurry comprising polyvinylalcohol and ammonium dichromate to yield weight ratio of 0.005:1 of MAP to yttrium oxide when the yttrium oxide host phosphor is added to the slurry. The formulation is applied to a substrate, exposed, developed, and dried by methods known to those skilled in the art.

The rare-earth oxide host phosphor so treated exhibited essentially the same cathode-ray brightness as virgin phosphor, and essentially no hydrolytic reaction with the dichromate ion.

Larger amount of MAP, such as weight ratios of MAP to $Y_2O_3$ of 1:100, 1:50, 1:25 and 1:10, are used with substantially similar results.

EXAMPLE 3

Example 1 is repeated using essentially equal weight amounts of gadolinium oxide in place of yttrium oxide and essentially the same results are obtained.

EXAMPLE 4

Example 2 is repeated using about 1 part gadolinium oxide in place of yttrium oxide and essentially the same results are obtained.

EXAMPLE 5

Example 1 is repeated using about 1 part yttrium-gadolinium oxide in place of yttrium oxide and essentially the same results are obtained.

EXAMPLE 6

Example 2 is repeated using about 1 part lanthanum oxide and essentially the same results are obtained.

While there have been shown and described what are at present considered the preferred embodiments of the invention, it will be obvious to those skilled in the art that various changes and modifications may be made therein without departing from the scope of the invention as defined by the appended claims.

What is claimed is:

1. In the process wherein a layer of a rare-earth oxide host phosphor is applied to a substrate by photochemical means using a slurry comprising an organic binder, said rare earth oxide phosphor and a dichromate sensitizer, the improvement comprising admixing a water-soluble orthophosphate source with said rare-earth oxide host phosphor, wherein said water-soluble orthophosphate source is present in an amount of about 0.5% to about 10%, by weight, with respect to the weight of said phosphor, prior to adding said rare-earth oxide host phosphor to said slurry composition.

2. A method according to claim 1, wherein said rare-earth oxide host phosphor is selected from the group consisting of yttrium oxide, gadolinium oxide, lanthanum oxide, and yttrium gadolinium oxide.

3. A method according to claim 1, wherein said water-soluble orthophosphate is selected from the group consisting of ammonium orthophosphates, alkali metal orthophosphates, and mixtures thereof.

4. A method according to claim 3, wherein said water-soluble orthophosphate is monoammonium orthophosphate.

5. A method according to claim 3, wherein said water-soluble orthophosphate is orthophosphoric acid.

6. In the process wherein a layer of a rare-earth oxide host material is applied to a substrate by photochemical means using a slurry comprising an organic binder, said rare earth oxide phosphor and a dichromate sensitizer, the improvement comprising admixing a water soluble orthophosphate source with a slurry comprising an organic binder and a dichromate ion-furnishing compound, where said water-soluble orthophosphate source is present in an amount of about 0.5% to about 10%, by weight, with respect to the weight of said phosphor, prior to adding said rare-earth oxide host phosphor.

7. A method according to claim 6, wherein said binder is polyvinylalcohol.

8. A method according to claim 6, wherein said dichromate ion-furnishing compound is ammonium dichromate.

9. A method according to claim 6, wherein said rare-earth oxide host phosphor is selected from the group consisting of yttrium oxide, gadolinium oxide, lanthanum oxide, and yttrium gadolinium oxide.

10. A method according to claim 6, wherein said water-soluble orthophosphate source is selected from the group consisting of ammonium orthophosphates, alkali metal orthophosphates, and mixtures thereof.

11. A method according to claim 10, wherein said water-soluble orthophosphate source is monoammonium orthophosphate.

12. A method according to claim 10, wherein said water-soluble orthophosphate source is orthophosphoric acid.

References Cited

UNITED STATES PATENTS

| | | | |
|---|---|---|---|
| 3,017,288 | 1/1962 | Windsor | 252—301.3 R |
| 3,461,077 | 8/1969 | Kobayashi et al. | 252—301.3 R |

ROBERT D. EDMONDS, Primary Examiner

U.S. Cl. X.R.

96—36.1, 88; 252—301.3 R